UNITED STATES PATENT OFFICE.

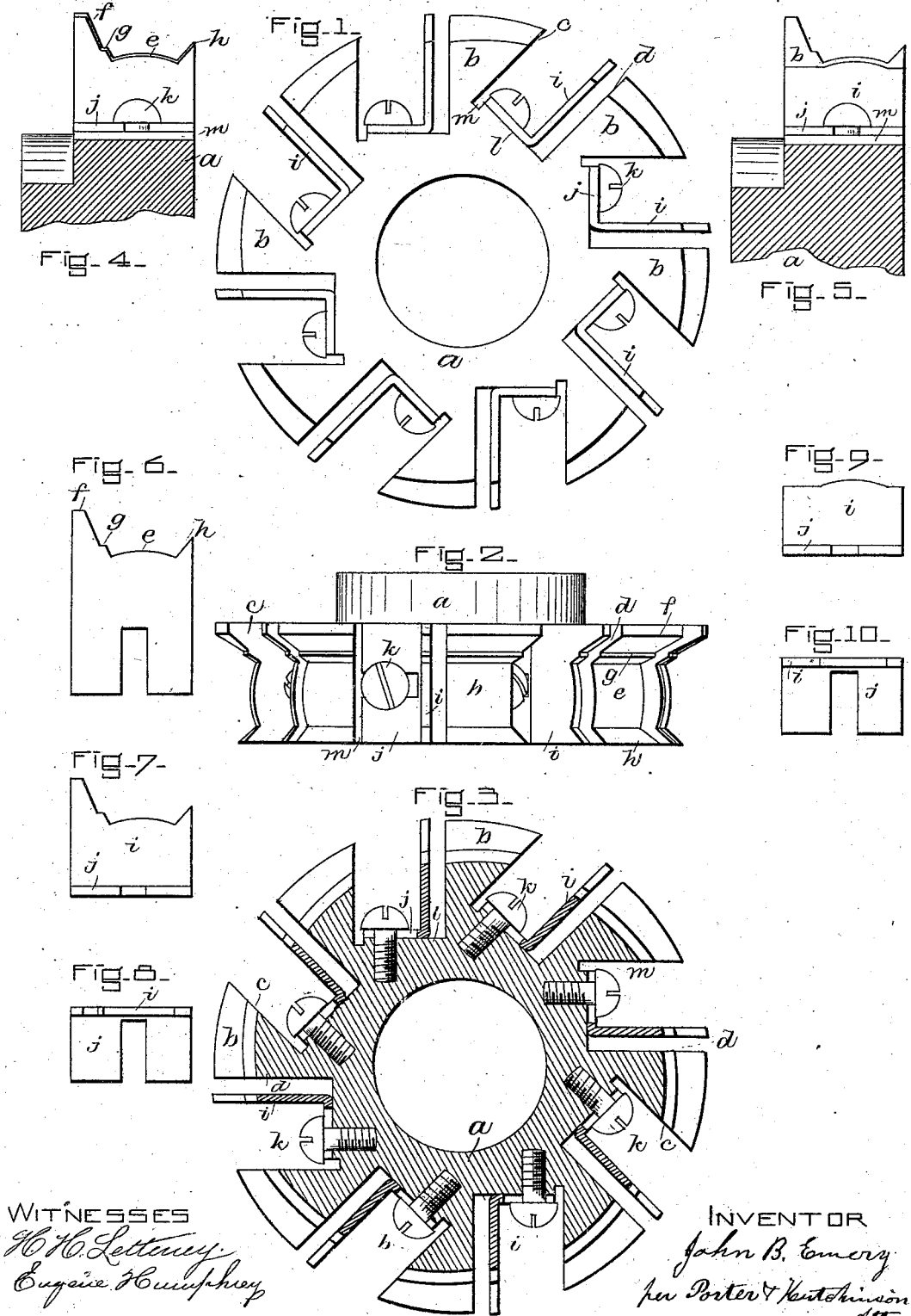

JOHN B. EMERY, OF LYNN, MASSACHUSETTS.

CUTTER-HEAD.

SPECIFICATION forming part of Letters Patent No. 292,422, dated January 22, 1884.

Application filed November 10, 1883. (No model.)

*To all whom it may concern:*

Be it known that I, JOHN B. EMERY, of Lynn, in the county of Essex and State of Massachusetts, have invented a new and useful Improvement in Rotary Cutters, which will, in connection with the accompanying drawings, be hereinafter fully described, and specifically defined in the appended claims.

This invention relates to that class of rotary cutters which are more especially or usually employed in forming molded edges or outlines—that is, edges or outlines that are beaded, curved, or otherwise molded, in contradistinction to straight, in the line of the cross-section of the path thereby formed or cut—which cutters are also employed in outlining bodies without thus beading, curving, or molding the line of the cross-section of the path or edge so cut; and the invention consists in a peripheral guard, which is inserted and secured in each space between the teeth of the cutter, and projects outward relatively to the peripheral line of the teeth to such extent that each guard serves to gage the depth of cut of the succeeding tooth, and to throw the preceding tooth out of its cut before the succeeding tooth enters upon its cut.

In the accompanying drawings my invention is shown in connection with a cutter adapted to trim or outline the edge of boot and shoe soles, and it is shown as of about twice the diameter usual in such cutters.

Figure 1 is a side elevation of such cutter embodying my invention. Fig. 2 is a top or edge view of the cutter shown in Fig. 1. Fig. 3 is a section taken through the cutter and guard shown in Fig. 1, and parallel with and equidistant from the respective planes thereof. Fig. 4 is a detached diametric section taken from the center to the base of a tooth-front, and as looking toward the preceding tooth, and also showing the guard in position. Fig. 5 is a view similar to Fig. 4, but showing a guard of modified form. Fig. 6 is a plan view of a guard-blank as cut from a sheet of metal. Fig. 7 is a detached view of a guard, shown in elevation, as in Fig. 4. Fig. 8 is a top plan view of the guard shown in Fig. 7. Fig. 9 is a view like Fig. 7, but showing the guard in modified form. Fig. 10 is a view similar to Fig. 8, but showing a modification of the guard.

In these views, $a$ represents the body of the cutter, which is formed with a central passage for the reception of its supporting and rotating arbor. The periphery of the cutter is subdivided into teeth $b$, whose front face, $c$, is sufficiently oblique to a radial line to give the requisite overhang thereto and the desired acuteness of the angle between said front line and the outer or peripheral line of the teeth. The back face, $d$, of the teeth is preferably formed parallel, or nearly so, with the front face of the succeeding tooth, and at such distance therefrom as the size and requisite number of the teeth will admit, and the bottom $l$ of said space is formed straight and preferably at right angles to lines $c$ $d$, as shown. The outer or peripheral line of teeth, $b$, is shown as formed as an arc of a circle oblique to the periphery of the cutter; such oblique arc retiring from the peripheral line or true circle of the cutter from the front to the rear face of the teeth; and the outer or peripheral face of the teeth is molded the converse of the contour of the cross-section of the path they are intended to cut, and in the drawings they are shown as having a convex "bed," $e$, a "guard," $f$, which rests against the bottom of the sole, a "bead," $g$, and a "rand-lip," $h$, which removes the sole next the upper to form the rand.

The peripheral guard, which I arrange between the teeth $b$, is formed of sheet metal—preferably of brass or an analogous alloy—to prevent the discoloring of the leather which would result from using iron or steel, which guard is first punched by dies therefrom as a blank, (shown in Fig. 6,) which is bent at the dotted line there shown, so that its arms or members are at an angle coinciding with that resulting from the relative positions of back face, $d$, and base $l$ of the space between the teeth. One arm of guard $i$ is formed with a longitudinal slot, for the reception of the securing-screw $k$, and to admit of the adjustment of the guard at the proper distance from the back face, $d$, of the preceding tooth, for the object to be stated. Said guard $i$ is shown in Figs. 1, 2, 3, 4, 6, 7, 8 as having the convex bed $e$, guard $f$, bead $g$, and rand-lip $h$, corresponding with the cross-section of the peripheral line of teeth $b$; but in Figs. 5, 9, 10 it is formed with bed $e$, corresponding to that of the teeth, but with the guard and lip omitted;

but there is a decided advantage in retaining them, as they tend to bring the "feather-edge" of the leather left by one tooth into the path of the next, which cuts it free. The molded or radial end of guard $i$ being higher than the back face, $d$, of teeth $b$, therefore, by arranging said guard at a greater distance from the front of the preceding tooth, it will, by its contact with the sole, force the same out of contact with the tooth sooner than if arranged nearer to such tooth; and hence, if desired, the bed of the guard, which rests upon bed $l$ of the cutter, may be shorter than the latter, so as to admit an adjustment of the guard toward the preceding tooth, with which it coacts, when, by the sharpening of the teeth by grinding away the front face, $c$, they are lowered relatively to the peripheral line of the cutter, as then, by moving and securing the guard nearer to the back of the tooth it is, by reason of the angle of line $l$ relatively to the periphery of the cutter, lowered therefrom, so as to resume its former peripheral relation to the cutting-edge of the tooth. At the rear of base $l$, I form a depression, $m$, across the cutter, to facilitate the grinding of face $c$, as such groove admits the thin beveled edge of the grinding-wheel by which the cutter is sharpened. In use, when a cutter is provided with my improved guard, each tooth, as it enters the sole, moves in its path therein until the succeeding guard, $i$, by its contact with the surface of the sole, along which the tooth had first passed, forces the sole out of contact with such tooth, and then the guard gages the depth of cut of the next tooth. By means of my guard a less number of teeth, and consequently greater space between them, becomes available, and in nearly the same proportion as the space between the points of the teeth is increased will the length of the cut in the sole by each tooth be increased, the only variation of such ratio being the before-described forcing of the sole away from the cutter by the guard $i$ when the latter encounters the sole; and by the increase of the length of cut by each tooth the smoothness of such cut is increased, for when the teeth are near enough together for each to act as the guard of the preceding, as has been heretofore done, they merely touch the sole at a single point, and remove the leather by a tearing action resulting from impact, while with less teeth and the interposed guard each tooth removes the leather by a knife-like sliding cut along the edge of the sole.

I make no claim to the cutter proper, as herein shown and described, as the teeth, their peripheral obliquity relative to the true circle of the cutter, and the transverse molding of such peripheral face of the teeth, are and have been for many years old, common, and well-known; hence my invention and claim are confined to the guard, its combination with the cutter, and the peculiarities of the cutter that coact therewith.

I claim as my invention—

1. In combination with a rotary cutter, $a$, subdivided into teeth $b$, a removable guard secured between the respective teeth and projecting outward, so as to gage the depth and extent of cut of the teeth, substantially as specified.

2. In combination with cutter $a$, subdivided into teeth $b$, a guard, $i$, formed to be secured to the base of the slot between the teeth, and extending outward to serve as a peripheral guard to control the cut of said teeth, substantially as specified.

3. In combination with rotary cutter $a$, subdivided by teeth $b$, molded upon their periphery, the counterpart of the desired form of the sole-edge, a guard, $i$, secured between the teeth and projecting outward to form a peripheral guard, to determine the cut of the respective teeth, and formed at such projecting end to correspond with the peripheral form of the teeth, substantially as specified.

4. In combination with cutter $a$, subdivided by teeth $b$, a guard, $i$, secured by screws $k$, and having a slotted base whereby said guard may be adjusted relatively to the front and rear faces of the adjacent teeth, substantially as specified.

5. In a rotary cutter, and in combination with a removable guard, $i$, the front line, $c$, and rear line, $d$, of the teeth, formed at right angles, or nearly so, with the base $l$ of the slots between the teeth.

6. In a rotary cutter subdivided into teeth, a peripheral guard, $i$, formed of brass or an analogous alloy, and arranged between the teeth, to control the cut thereof, substantially as specified.

JOHN B. EMERY.

Witnesses:
T. W. PORTER,
M. L. EDDY.